Nov. 18, 1952  A. V. MRSTIK  2,618,534
ALKYLATION REACTOR
Filed April 15, 1950
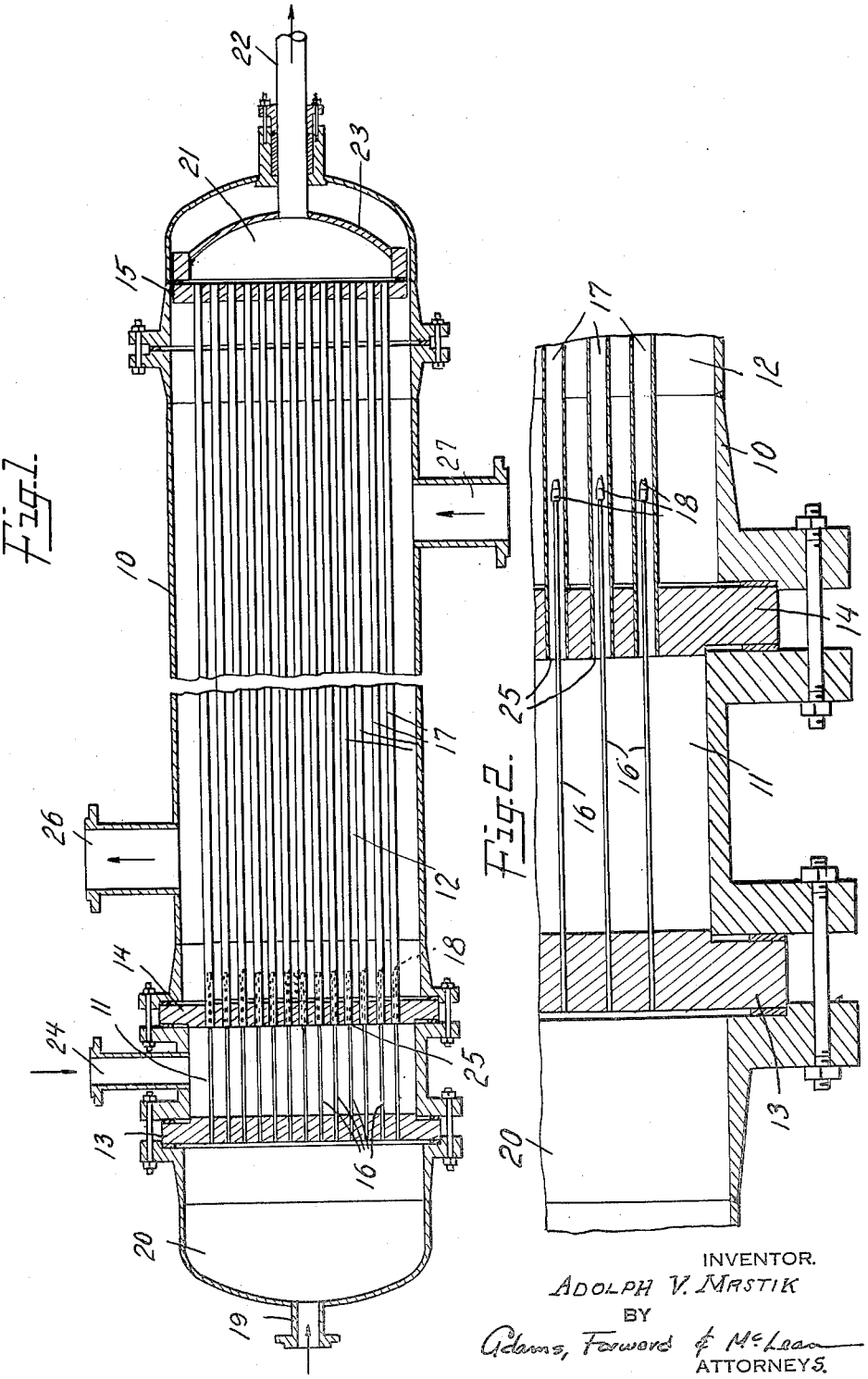
INVENTOR.
ADOLPH V. MRSTIK
BY
Adams, Forward & McLean
ATTORNEYS.

Patented Nov. 18, 1952

2,618,534

UNITED STATES PATENT OFFICE 2,618,534

ALKYLATION REACTOR

Adolph V. Mrstik, Harvey, Ill., assignor to Sinclair Refining Company, New York, N. Y., a corporation of Maine Application April 15, 1950, Serial No. 156,121

1 Claim. (Cl. 23—285)

My invention relates to apparatus for alkylating a tertiary paraffin with an olefin in the presence of sulfuric acid.

In my copending application, Serial No. 156,122 filed April 15, 1950, I have disclosed an improved method for alkylating a tertiary paraffin with an olefin in the presence of sulfuric acid. As stated in my copending application, in conventional alkylation processes, the reaction is carried out in one or more zones so as to provide sufficient time for conversion of the paraffin to the desired alkylate. However, even under satisfactory conditions of contact and reaction, considerable quantities of sulfuric acid catalyst are consumed in carrying out the reaction for any desired alkylate. It appears from my studies that the alkylation reaction occurs stepwise and the course of the reaction as well as the quality of alkylate obtained depends in large measure upon an initial, almost instantaneous reaction between olefin and acid resulting in the formation of an intermediate acid-olefin complex. A second major step in the course of the reaction, taking place in a considerably longer period of time, is the reaction of this intermediate with the paraffin to form the desired alkylate. In a system where all the reaction components are present for any period of time, side reactions occur such as the reaction of the olefin complex with fresh olefin. According to my studies, this reaction of the olefin with the intermediate product has a harmful effect upon product yield, product quality and acid consumption. As a result, excessive amounts of sulfuric acid are used to produce alkylates of inferior quality. The reaction is essentially carried out in two separate reaction stages, an initial stage where partial reaction takes place in an instantaneous period of time, and a second stage where the reaction is carried out to completion in a considerably longer period of time. By an instantaneous period of time I mean an extremely short time interval, a matter of several seconds. According to this method, a mixture of paraffin and olefin is contacted in stream flow for an instantaneous period of time with a high ratio of sulfuric acid, by ejecting the olefin-paraffin mixture into a reaction tube, contacting the mixture at the point of ejection with acid, and passing the mixture, containing entrained acid, as a rapidly flowing stream out of the contact zone (the first stage) and into an enlarged reaction zone where sufficient time and agitation is provided to complete the alkylation reaction (the second stage). Advantageously, the paraffin-olefin mixture is ejected as a plurality of streams into corresponding reaction tubes which accomplishes particularly satisfactory results.

The present invention provides a reaction vessel especially adapted for carrying out the initial or instantaneous reaction.

The reaction vessel comprises an elongated chamber divided into two separated compartments. A set of tubes of small cross-sectional area is positioned in each compartment so that each set traverses the length of its compartment. The sets of tubes are also in communication with each other so that the tubes of the first set, designated the "feed" tubes, pass within and discharge into the corresponding tubes of the second set, designated the "reaction" tubes. Provision is made for introducing acid at the vicinity where the feed tubes discharge into the reaction tubes, and also for transferring heat from the reaction tubes. Means are also provided for passing the fluid reactants into each of the reaction tubes and, additionally, for collecting the partially reacted fluid that is discharged from the reaction tubes.

The reaction vessel according to my invention provides for maximum intimate contact and dispersion between olefin, paraffin and acid, for carrying out the reaction in an instantaneous period of time, and for heat transfer as desired from the reaction tubes, as by circulation of a refrigerant. In an advantageous embodiment, the reaction vessel is a cylindrical shell divided into two central fluid-tight compartments by three plates. In addition, feed and exit chambers are provided at either end for distribution of the reaction mixture to each reaction tube and for collection of the reacted mixture after reaction in the reaction tubes. The feed tubes traverse the length of the forward compartment and discharge into corresponding reaction tubes positioned in the rear compartment. The central compartments as well as the forward and rear chambers are separated from each other by three plates so that fluid circulating in each compartment or chamber, but outside the tubes, cannot pass from one into another, other than by means of the tubes. In addition, each of the feed tubes is preferably capped with a jet nozzle which serves to increase further the stream velocity. The actual nozzle or orifice used will depend upon the pressure drop permissible with the chamber and tube construction. The feed tubes should pass a sufficient distance into the reaction tubes to insure that all of the discharging fluid enters the reaction tubes. Generally speaking, the greater the number of tubes present the more efficient will be the reaction since better dispersion and contact is possible. The cross-sectional area and length of each set of tubes largely determines the velocity of the feed streams as well as the period of time in which the reaction is carried out.

Provision is made so that acid is introduced at the points where the feed tubes discharge into the reaction tubes. Advantageously, this may be accomplished by making the feed tubes of smaller cross-sectional area where they enter the reaction tubes. Thus, the acid is advantageously introduced around the open junctures formed where the feed tubes enter the reaction tubes. The acid may be introduced through any opening in the chamber wall of the compartment housing the feed tubes and is passed to the annular openings between the two sets of tubes. The acid flow may be regulated to any desired rate by pumping.

The fluid reactants, i. e., the olefinic and paraffinic constituents to be reacted, are introduced into each of the feed tubes. This may be accomplished by passing the reactants through a pipe or other conduit into a forward chamber which will distribute the reactants to each tube. The reacted mixture emerging from each of the reaction tubes is collected in a rear chamber for passage by suitable conduit to other zones of treatment. The reaction tubes are advantageously refrigerated by passing a heat transferring fluid into the compartment housing the reaction tubes. For instance, ammonia may be circulated through the compartment by means of suitable openings in the shell of the compartment.

Thus the reaction vessel according to my invention provides a single apparatus for carrying out the first stage of the alkylation improvement I have disclosed in my copending application, Serial No. 156,122. High velocity jet streams of reactant material are discharged into reaction tubes for carrying out this first reaction in an instant of time, practically speaking, in a matter of a few seconds. Thorough dispersion and mixture of olefin and paraffin reactants in the acid is provided by the jet streams' discharge at the tube junctures, so that good, uniform contact is maintained between the reacting materials. Minimum reaction time is assured by using reaction tubes of small diameter and limited length.

The accompanying drawings are intended to more clearly illustrate my invention. Figure 1 is a cross-sectional view across the central plane of a cylindrical reaction vessel according to my invention; Figure 2 is an enlarged partial cross-sectional view of the chamber across the same plane showing particularly the feed tubes as they discharge into the reaction tubes.

According to the drawings, the reaction vessel comprises an outer elongated cylindrical shell 10 divided into two separated central compartments 11 and 12. The vessel and its component parts may be made of steel or any other suitable material resistant to reaction conditions. The cylindrical shell 10 is divided into the two central compartments 11 and 12 by three circular plates 13, 14 and 15 each having a plurality of perforations. The periphery of each plate is in fluid-tight engagement with the shell. Two sets of tubes, positioned parallel, traverse the length of each compartment, the feed tubes 16 in the compartment 11 and the reaction tubes 17 in the compartment 12. Each tube making up the reaction set of tubes passes through, at each extremity, an opening in plates 14 and 15 so that its periphery is in fluid-tight engagement with the plate. Each such tube is open at both ends. Each tube of the feed set, corresponding in number to the reaction tubes, passes through a perforation in plate 13 and is secured in fluid-tight engagement at its periphery with the plate. At the other extremity of each of the feed tubes, the tubes pass a short distance into a corresponding reaction tube and terminate with a jet orifice 18. Each such feed tube is also open, at each end. The reaction vessel is arranged so that compartments formed by the three plates are separated from each other so that fluid will not pass from one compartment to another other than by means of the tubes. An intake conduit 19 and chamber 20 is provided for distributing the fluid feed to each of the feed tubes. An outlet conduit 22 and chamber 21 is provided for taking off the fluid from the reaction tubes. A floating head 23 is also provided inside of the outlet chamber 21 to allow for any expansion or contraction of the vessel due to thermal conditions. Acid is introduced by opening 24 into compartment 11 for admission into the reaction tubes to the point where the feed tubes discharge. The acid passes into compartment 11 and enters the reaction tubes by means of the annular space 25 formed where the feed tubes enter the reaction tubes. The acid flow may be regulated to any desired rate by a pump (not shown). Openings 26 and 27 are provided into the compartment 12 for circulation of a refrigerant such as ammonia.

I claim:

An initial stage reactor for the alkylation of a tertiary paraffin with an olefin in the presence of sulfuric acid wherein deleterious reactions between fresh olefins and acid-olefin complexes are advantageously inhibited comprising an elongated chamber having an inlet end and an outlet end; a first plate transversely positioned in fluid tight engagement with said chamber adjacent said inlet end; a second plate transversely positioned in fluid tight engagement with said chamber adjacent said outlet end; a third plate transversely positioned in fluid tight engagement with said chamber between said first and second plate defining a feed compartment and a reaction compartment; means for supplying a paraffin-olefin mixture to said chamber inlet end; means for supplying sulfuric acid to said feed chamber; means for discharging the resultant mixture from said chamber outlet end; means for contacting said paraffin-olefin mixture with said sulfuric acid with minimum contact of fresh olefins with acid-olefin complexes comprising a reaction tube for providing communication between said feed compartment and said chamber outlet mounted in said second plate and said third plate and extending through said reaction compartment, an unobstructed feed tube for producing a freely flowing stream of said paraffin-olefin mixture in said reaction tube mounted in said first plate and extending through said feed chamber and into said reaction tube for a relatively short distance, said reaction tube being of a size sufficient to accommodate said feed tube and provide a passageway thereby for free flow of sulfuric acid into said reaction tube from said feed chamber, said reaction tube being unobstructed to insure smooth fluid flow with minimum contact of fresh olefins with acid-olefin complexes; and means for controlling the temperature of the reaction tube.

ADOLPH V. MRSTIK.

REFERENCES CITED

The following references are of record in the file of this patent:

UNITED STATES PATENTS

| Number | Name | Date |
| --- | --- | --- |
| 2,385,200 | Friedel | Sept. 18, 1945 |
| 2,395,777 | Brunjes et al. | Feb. 26, 1946 |